US007452166B2

(12) United States Patent
von Keudell et al.

(10) Patent No.: US 7,452,166 B2
(45) Date of Patent: Nov. 18, 2008

(54) DEVICE FOR CONVEYING COATING POWDER AND METHOD FOR CONVEYING POWDER WITH THE CONVEYING DEVICE

(75) Inventors: Leopold von Keudell, Salem (DE); Thomas Schwarz, St. Gallen (CH)

(73) Assignee: J. Wagner AG, Altstatten (CH)

( * ) Notice: Subject to any disclaimer, the term of this patent is extended or adjusted under 35 U.S.C. 154(b) by 0 days.

(21) Appl. No.: 11/346,412

(22) Filed: Feb. 2, 2006

(65) Prior Publication Data

US 2007/0095945 A1 May 3, 2007

(30) Foreign Application Priority Data

Feb. 11, 2005 (DE) ...................... 10 2005 006 522

(51) Int. Cl.
*B65G 53/58* (2006.01)

(52) U.S. Cl. ......................... 406/98; 406/137; 406/146; 406/196

(58) Field of Classification Search ................... 406/76, 406/98, 137, 146, 196
See application file for complete search history.

(56) References Cited

U.S. PATENT DOCUMENTS 2,412,397 A * 12/1946 Harper ....................... 417/474
4,025,121 A * 5/1977 Kleysteuber et al. .......... 406/96
4,521,165 A * 6/1985 Handleman ................. 417/393
4,893,966 A * 1/1990 Roehl ......................... 406/127
6,283,680 B1 * 9/2001 Vidal ......................... 406/128
6,447,216 B1 * 9/2002 Higuchi et al. ................ 406/27
6,478,513 B1 * 11/2002 Higuchi et al. ................ 406/19
6,508,610 B2 * 1/2003 Dietrich ....................... 406/13
6,623,215 B2 * 9/2003 Dietrich ...................... 406/197
6,712,238 B1 * 3/2004 Mills ........................... 222/61
6,953,315 B2 * 10/2005 Cartwright .................. 414/217
7,144,213 B2 * 12/2006 Cartwright .................. 414/217
7,150,585 B2 * 12/2006 Kleineidam et al. ........... 406/50
7,163,359 B2 * 1/2007 Moser ......................... 406/74

FOREIGN PATENT DOCUMENTS

DE 10 53 968 A1 4/1954
DE 103 00 280 1 7/2004
DE 103 53 968 7/2005
WO 03/024612 A1 3/2003

* cited by examiner

*Primary Examiner*—Douglas A Hess
(74) *Attorney, Agent, or Firm*—Renner, Otto, Boisselle & Sklar, LLP

(57) ABSTRACT

A device for conveying coating powder has an inlet valve, an outlet valve and a powder conveying chamber made from a flexible conveying chamber hose. The powder conveying chamber is arranged between the inlet valve and the outlet valve and has a conveying air inlet. In addition, the volume of the powder conveying chamber can be modified by a deformation of the conveying chamber hose.

15 Claims, 3 Drawing Sheets

DEVICE FOR CONVEYING COATING POWDER AND METHOD FOR CONVEYING POWDER WITH THE CONVEYING DEVICE

TECHNICAL FIELD

The invention relates to a device for conveying coating powder and to a method for conveying coating powder with the help of the conveying device.

In order to coat objects or work pieces with coating powder, the coating powder—or succinctly powder—is conveyed from a powder reservoir with the help of a powder conveying device to a power spray gun and there brought on to the work piece with the powder spray gun.

BACKGROUND OF THE INVENTION

A powder conveying device, which is also called pump equipment for powder, is known from the state of the art DE 103 00 280 A1. The pump equipment described there comprises two mechanically synchronized membrane pumps, which alternately convey the coating powder. Each of the two membrane pumps has an inlet valve, a dosing chamber and an outlet valve. If the inlet valve is opened and a negative pressure is generated in the dosing chamber with the help of a disk shaped membrane, the powder is sucked into the dosing chamber. Subsequently, the inlet valve is closed and with the help of compressed air, which is blown into the dosing chamber, the coating powder from the dosing chamber is blown out from the dosing chamber via the outlet valve that is now opened. The movement of the membranes of the two membrane pumps takes place over a piston rod, which connects the two membranes together. Due to this, if the chamber volume is increased in the first dosing chamber with the help of the membrane, the chamber volume in the second dosing chamber reduces automatically. This type of conveying device for powders is complex to manufacture. Moreover, a considerable time and effort is necessary for controlling the drive, that is to say the piston rod. Four sensors are necessary for detecting the position of the piston rod alone. Another disadvantage is that the conveying device must be cleaned in case of a color change and that is time consuming.

A conveying device for coating powders with a hose membrane pump is known from the post-published state of the art DE 103 53 968 A1, which has a powder inlet valve at the powder inlet and a powder outlet valve at the powder outlet of a conveying chamber. Both the powder inlet valve as well as the powder outlet valve are developed as passive valves, which are opened by the flow pressure of the conveyed powder and close themselves automatically again, if the flow pressure of the powder is sufficiently low.

An alternative device for conveying powder is described in the patent application WO 03/024612 A1. It concerns a so-called piston pump, which has a first piston led into a first conveying chamber and a second piston led into a second conveying chamber. The powder is conveyed here alternately with the help of negative pressure generated through the first and/or through the second piston during their suction stroke. Subsequently, the powder is blown out, with the help of compressed air, from the conveying chamber in the direction of the powder spray gun. After that the one piston goes back into its initial position while the other piston executes a suction stroke. A disadvantage in this embodiment is that a seal is required between the conveying chamber and the conveying piston in order to prevent the powder between conveying chamber and conveying piston from escaping from the conveying device. However, in this case the danger exists that the powder is to be deposited at the seal and there could be an undesirable hardening of the powder and a caking of the powder at the conveying piston, the seal or the walls of the conveying chamber. Furthermore, the described powder conveying device is time consuming to clean in case of a color change.

In addition, devices for conveying powder are also known, which work according to the Venturi principle. In this case, in one so-called injector, negative pressure is generated in the injector with the help of a continuous conveying air flow and that leads to powder being sucked in from a powder reservoir and being conveyed, together with the conveying air flow, in the direction of the powder spray gun. However, the conveying device working according to the Venturi principle has the disadvantage that the suctioning capacity is relatively low and that, moreover, the length of the hose between the powder conveyor and the powder spray gun may not become too long.

SUMMARY OF THE INVENTION

An object of the invention is therefore to indicate a device for conveying coating powder, which is easy to manufacture, which has a sufficiently high suctioning capacity and which can be run trouble-free. In addition, the conveying device should work without wear.

Another object is to specify a method for conveying powder with the conveying device according to the invention.

The device according to the invention for conveying coating powder has an inlet valve, an outlet valve and a powder conveying chamber made from a flexible conveying chamber hose. The powder conveying chamber is arranged between the inlet valve and the outlet valve and has a conveying air inlet. Moreover, the volume of the powder conveying chamber can be modified by deforming the conveying chamber hose.

The method according to the invention for conveying powder with the conveying device described above includes the following steps. In a first step, the inlet valve is closed, the outlet valve is opened and conveying air is blown into the powder conveying chamber via the conveying air inlet. In a second step, the volume of the powder conveying chamber is decreased. In a third step, the outlet valve is closed and the inlet valve is opened. Finally, the volume of the powder conveying chamber is increased. The above stated steps can be repeated as often as required.

Advantageous further developments of the invention result from the characteristics stated in the dependent claims.

In a first embodiment of the conveying device according to the invention, the inlet valve und/or the outlet valve are developed as pinch valve. As an advantage, pinch valves can be manufactured easily and cost-effectively.

In a second embodiment of the conveying device according to the invention, the inlet valve und/or the outlet valve have a hose, whereby the cross section of the hose can be modified. The modification of the cross-section of the hose can be reached in simple way by pressurizing the hose from outside with compressed air.

In a third embodiment of the conveying device according to the invention the hose of the inlet valve und/or the hose of the outlet valve and the conveying chamber hose are sections of a single hose. This has the advantage that the sealing of the powder canal can be achieved in the inside of the powder conveying device without the need of a separate measure for this purpose.

In an alternative embodiment of the conveying device according to the invention, the inlet valve und/or the outlet valve are developed as check valves. In another embodiment, the check valve is a ball valve.

In another design of the conveying device according to the invention, a pressure chamber surrounding the conveying chamber hose is provided.

Advantageously, a housing is provided in the case of the powder conveying device according to the invention, in which the conveying chamber hose is arranged. Here the housing and the conveying chamber hose form the pressure chamber.

In another design of the conveying device according to the invention, the pressure chamber can be filled with compressed air. Instead of it, it can also be of advantage to fill the pressure chamber with hydraulic fluid.

Moreover it is of advantage if a negative pressure can be applied to the pressure chamber of the conveying device according to the invention and if the pressure chamber is shaped in such a way that, if a sufficient negative pressure prevails in the pressure chamber, the pressure chamber and/or the wall of the housing defines the end position of the conveying chamber hose. Thanks to the negative pressure generated in the pressure chamber, the volume of the hose can be increased even further, by what the conveying capacity of the conveying device can also be increased.

Alternatively to the proposed embodiments, the conveying device can have a piston, through which the conveying chamber hose can be deformed.

Furthermore the conveying chamber hose of the conveying device according to the invention can be dimensioned in such a way that its length is at least twice its inside diameter.

It is further recommended that, in the case of the conveying device according to the invention, the conveying chamber hose has ethylene-propylene-diene-monomer, nitrile rubber or natural rubber.

According to another characteristic of the invention, the conveying device can have a double cone, which houses—on the one hand—the conveying chamber hose and—on the other hand—the hose of the inlet valve or of the outlet valve. As a result the assembly of the conveying device can be simplified.

Advantageously, in the case of the conveying device according to the invention, the conveying air inlet is arranged between the inlet valve and the powder conveying chamber. Consequently it can be guaranteed that the powder being in the powder conveying chamber is also completely blown out.

Finally, in the case of the method for conveying powder according to the invention, it can also be provided that the conveying air is blown into the conveying chamber for a specific period.

BRIEF DESCRIPTION OF THE DRAWINGS

These and other aspects of the invention are apparent from and will be elucidated in details with reference to two figures described hereinafter.

DETAILED DESCRIPTION OF THE INVENTION

Figure 1:
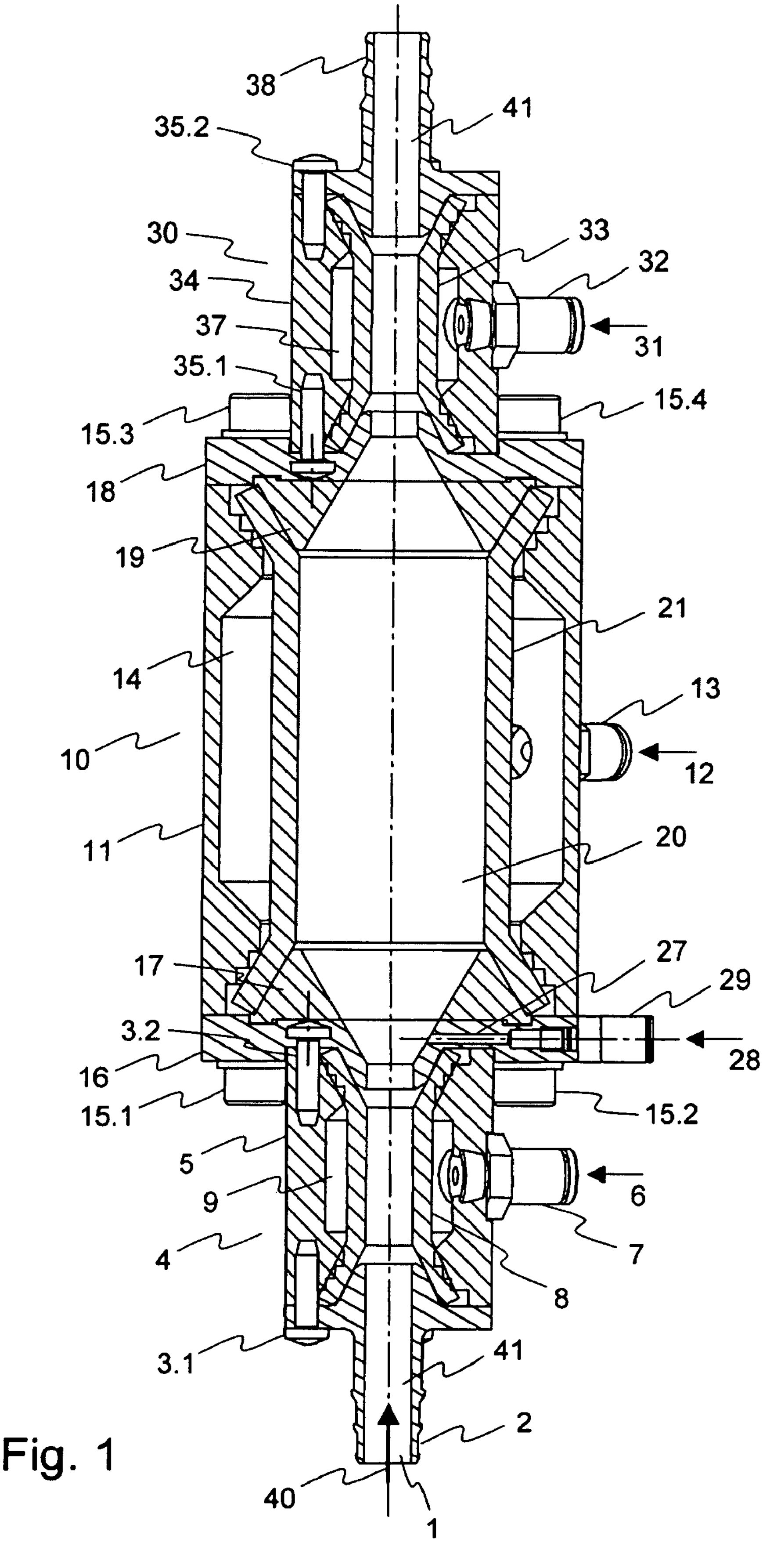
FIG. 1 shows a possible embodiment of the powder conveying device according to the invention in a cross-section.

A first possible embodiment of the powder conveying device according to the invention is shown in FIG. 1. The powder conveying device—which is also called powder conveyor in the following document—has an air intake fitting 2, via whose aspirating port 1, coating powder is sucked in, for example from a powder reservoir. The conveying direction of the coating powder is marked with the arrow 40.

The powder conveyor also has an inlet valve 4, whose housing 5 is screwed—on the one hand—together with the inlet connection piece 2 using a screw 3.1 and—on the other hand—together with a first housing cover 16 of the powder conveying tract 10 using a screw 3.2. The inlet valve 4 is developed as pinch valve and has inside a valve hose 8. A pressure chamber 9 of the inlet valve 4 can be loaded with compressed air 6 via a valve control line 7. The higher the pressure in the pressure chamber 9, the more the flexible valve hose 8 deforms itself, until it completely locks the powder suction canal 41, if the air pressure is sufficiently high.

The powder conveyor tract 10 is connected downstream to the inlet valve 4. The housing 11 of the powder conveyor tract 10 is closed with a first housing cover 16 on the suctioning-sided front side and with a second housing cover 18 on the front side on which the powder is blown out. A flexible hose 21—which is also called conveying chamber hose in the following document—is inside the powder conveyor tract 10 and such flexible hose 21 is clamped—on the one hand—between the housing 11 and a first double cone 17 and—on the other hand—between the housing 11 and a second double cone 19. The two double cones 17 and 19 are developed in such a way that they are used on the one hand for receiving the valve hoses 8 and 33 of the inlet valve and/or of the outlet valve and also for receiving the conveying chamber hose 21. A borehole 27 is provided in the first housing cover 16 of the powder conveying tract 10, the borehole 27 being connected with a conveying air connection 29, so that conveying air 28 can be blown into the powder conveying chamber 20. A pressure chamber 14 is provided between the housing 11 and the conveying chamber hose 21, such pressure chamber 14 can be loaded with compressed air 12 using a compressed air connection 13. Thereby, the conveying chamber hose 21 can be compressed and consequently the volume of the conveying chamber hose 21 can be reduced. Instead of that, a partial vacuum can also be generated in the pressure chamber 14, so that the conveying chamber hose 21 arches on the outside and its volume is increased further. The inside of the housing 11 forms, in this case, the outer stopper for the conveying chamber hose 21. The hoses 8, 21 and 33 are shown in FIG. 1 in the non-operative position. The first housing cover 16 is screwed together with the housing 11 with the help of the screws 15.1 and 15.2. The second housing cover 18 is screwed together with the housing 11 via the screws 15.3 and 15.4.

On the output side an outlet valve 30 is connected to the powder conveying tract 10, such outlet valve 30 being screwed together—on the one hand—with the second housing cover 18 of the powder conveying tract 10 using a screw 35.1 and—on the other hand—with an outlet connection piece 38 using a screw 35.2. The construction of the outlet valve 30 corresponds to that of the inlet valve 4. The pressure chamber 37 can be loaded with compressed air 31 via a valve control line 32 arranged in the housing 34 of the outlet valve 30, so that the valve hose 33 can be compressed.

The powder conveyor according to the invention is not restricted to the first embodiment shown in FIG. 1. As a result, for example, the inlet valve 4 and the outlet valve 30 can also be developed as check valves or as ball valves instead of being developed as pinch valves. If the powder conveyor is equipped with self-locking ball valves, the opening and/or locking of the powder conveying canal 41 does not take place with the help of the hose 8 and/or the hose 33, but respectively with the use of a valve ball. The powder conveyor according to the invention is arranged in such a way that its longitudinal axis is vertical. In the case of the inlet valve, the force of gravity provokes that, as soon as the suctioning pressure drops below a certain threshold, the ball falls back again into the valve seat, thereby closing the inlet valve automatically. On the other hand, in the case of the outlet valve, the force of gravity provokes that the ball falls back again into the valve seat, thereby closing the outlet valve, if the blow-off pressure drops below a certain threshold. The two ball valves can also be equipped with a restoring spring or a restoring means.

If required, the pressure chambers 9, 14 and 37 can also be loaded with hydraulics fluid instead of compressed air. The use of hydraulic fluid has the advantage that it is almost incompressible and that consequently the position of especially the conveying chamber hose 21 can be exactly predetermined. This way the supply of a specific quantity of hydraulic fluid causes an almost proportional reduction of the conveying chamber volume. As a result the quantity of the powder to be conveyed can be accurately controlled.

Basically it is of advantage, if the conveying chamber hose 21 is dimensioned in such a way that its length, especially its efficient length, is larger than its inside diameter. From a ratio of length to inside diameter of 2:1, the part of the clearance volume inefficient or hardly efficient for the powder conveyance is sufficiently small in order to ensure a sufficiently high conveying capacity. Up to a certain degree, the efficiency of the powder conveyor can be considerably increased with a as large as possible ratio of length to inside diameter. In order to deform the conveying chamber hose 21, the conveying chamber hose 21 consists of an elastic material, for example made from ethylene-propylene-diene-monomer (EPDM), nitrile rubber (NBR) or natural rubber (NR). The same applies also to the hoses 8 and 33 of the two valves.

In the FIGS. 2*a* to 2*e* schematic representations of the powder conveying device according to the invention are shown in different operating conditions. In the operating condition shown in FIG. 2*a* the inlet valve 4 is closed, the outlet valve 30 is opened and the conveying chamber hose 21 is in the non-operative position, so that the powder conveying chamber 20 has its maximum volume. The case that a negative pressure is generated in the pressure chamber 14, so that the powder conveying chamber 20 has an even bigger volume, represents a further development and for the moment remains unconsidered in the following document. Provided that powder is already in the powder conveying chamber 20, it is blown out in the in direction of the outlet valve 30 by conveying air, which is supplied through the conveying air connection 29.

Figure 2A:
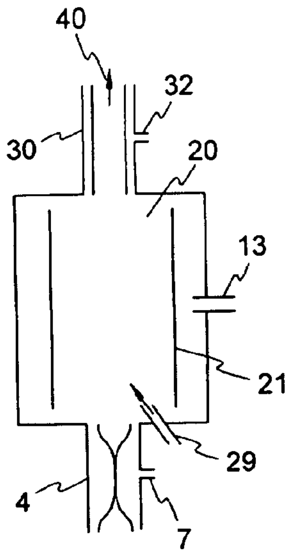
FIGS. 2*a* to 2*e* show the powder conveying device according to the invention in a cross-section in different operating conditions.
Figure 2B:
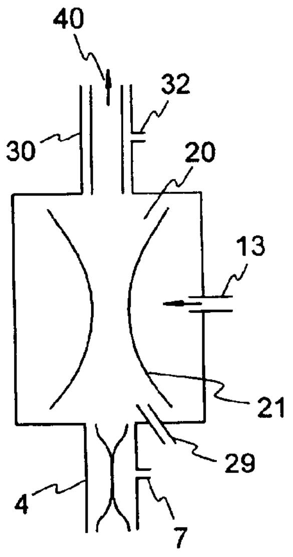

Now, as is shown in FIG. 2*b*, the conveying chamber hose 21 is put under pressure using the compressed air connection 13, so that it is narrowed in the cross-section and the volume in the powder conveying chamber 20 is reduced. In this case the powder air mixture still remaining in the powder conveying chamber 20 streams out and that is indicated with the arrow 40. The supply of the conveying air via the conveying air connection 29 is interrupted. In this condition, the powder conveyor is ready for aspirating in the powder.

Figure 2C:
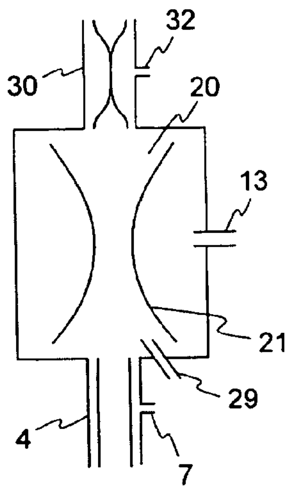

In a next step, as shown in FIG. 2*c*, the inlet valve 4 is opened and the outlet valve 30 is closed with the help of compressed air, which is supplied via the valve control line 32.

Figure 2D:
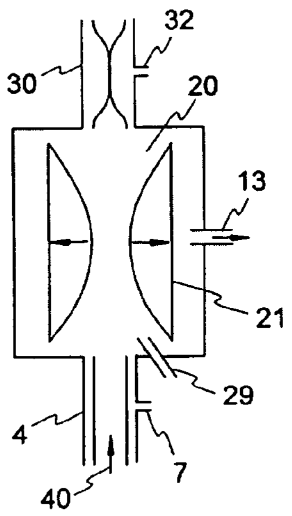

As shown in FIG. 2*d*, the pressure on the conveying chamber hose 21 is now reduced, so that it retracts into its original shape and due to this the volume in the powder conveying chamber 20 is increased. The negative pressure arising in this manner in the powder conveying chamber 20 causes the fact that powder, as marked by the arrow 40, is sucked in the powder conveying chamber 20.

Figure 2E:
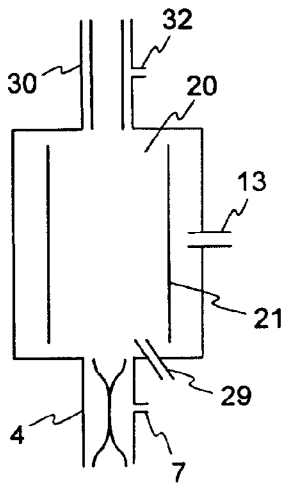

If the suctioning process is complete, as shown in FIG. 2*d*, the inlet valve 4 is closed with the help of compressed air, which is supplied via the control line 7 and the outlet valve 30 is opened, as all this is shown in FIG. 2*e*.

The blowing out of the powder now available in the powder conveying chamber 20 takes place with the help of the conveying air, as this was already explained for in FIG. 2*a*.

The phases of the powder conveyance shown in FIGS. 2*a* to 2*e* can be repeated as often as required.

Moreover, in the phase of the powder conveyance shown in FIG. 2*d*, a negative pressure can be generated in the pressure chamber 14 in order to increase the volume of the powder conveying chamber 20 even further.

Figure 3:
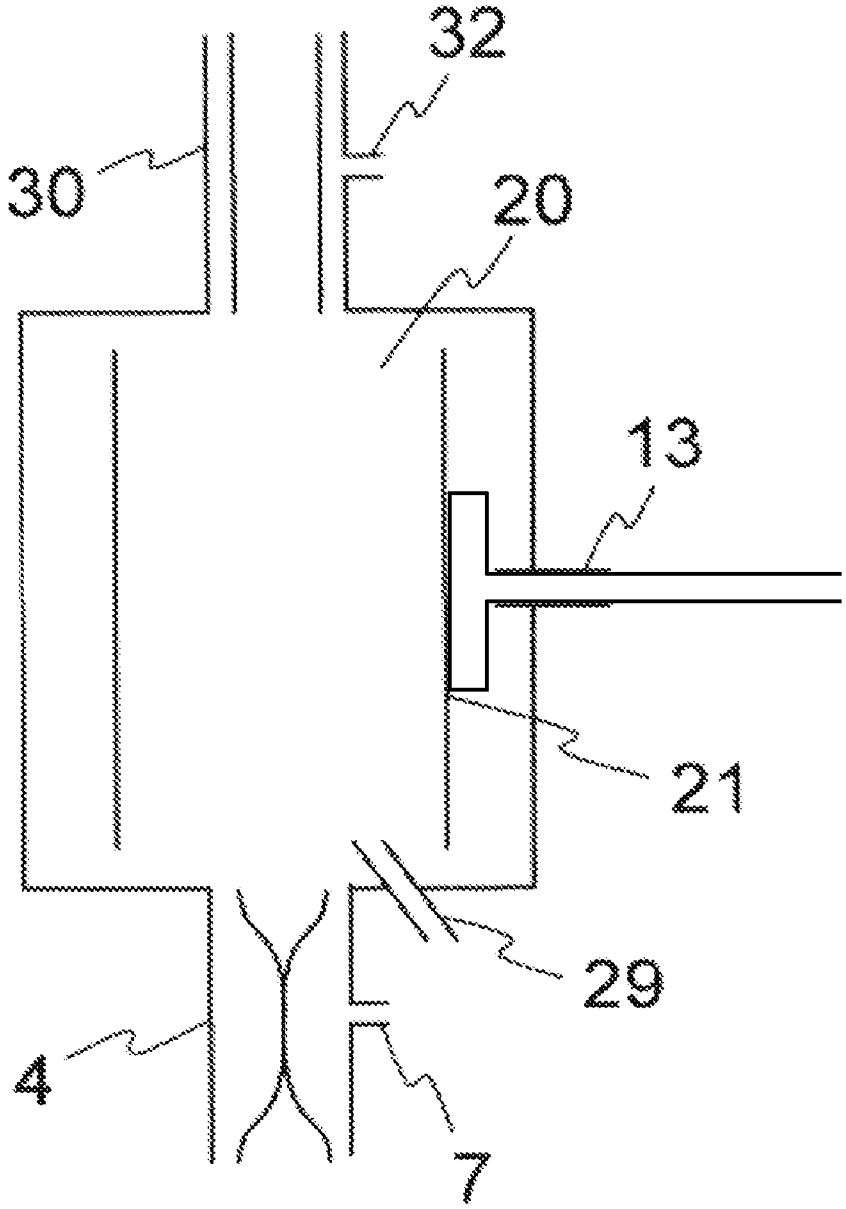
FIG. 3 shows another possible embodiment of the powder conveying device according to the invention in cross-section.

Alternatively to the embodiment shown in FIG. 1, the deformation of the conveying chamber hose 21 can also take place by using one or more pistons, which act upon the conveying chamber hose 21 (e.g., as represented in FIG. 3) by either compressing this one and thereby the volume in the powder conveying chamber 20 reduces, or by ensuring that the conveying chamber hose 21 can slacken and thereby the volume in the powder conveying chamber 20 increases.

As another alternative to the embodiment shown in FIG. 1, the hose 8 of the inlet valve 4, the hose 33 of the outlet valve 30 and the conveying chamber hose 21 can be sections of a single hose. In this manner the normally existing transitions or joints between the individual hoses can be avoided.

The preceding description of the embodiments according to the present invention is used only for illustrative purposes and not for the purpose of restricting the invention. Different alterations and modifications are possible within the framework of the invention without leaving the scope of the invention and its equivalents.

The invention claimed is:

1. A device for conveying coating powder, comprising:

an inlet valve and an outlet valve, wherein the inlet valve and/or the outlet valve can be controlled, and a flexible conveying chamber hose defining a powder conveying chamber, wherein the powder conveying chamber is arranged between the inlet valve and the outlet valve, the powder conveying chamber has a conveying air inlet for blowing conveying air into the powder conveying chamber, a pressure chamber surrounding the conveying chamber hose is provided, and a fluid connection for loading or evacuating the pressure chamber of fluid to alter the pressure within the pressure chamber wherein the volume of the powder conveying chamber is modified by deforming the conveying chamber hose by altering the pressure of the pressure chamber.

2. A device according to claim 1, wherein the inlet valve and/or the outlet valve are developed as pinch a valve.

3. A device according to claim 1, wherein the inlet valve and/or the outlet valve have a hose, whose cross-sections can be modified.

4. A device according to claim 3, wherein the hose of the inlet valve and/or the hose of the outlet valve and the conveying chamber hose are sections of a single hose.

5. A device according to claim 1, wherein the inlet valve and/or the outlet valve are developed as check valves.

6. A device according to claim 1, wherein a housing is provided, in which the conveying chamber hose is arranged, whereby the housing and the conveying chamber hose form the pressure chamber.

7. A device according to claim 1, wherein the pressure chamber is filled with compressed air or with a hydraulic fluid.

8. A device according to claim 1, wherein a negative pressure is applied to the pressure chamber and such pressure chamber is shaped in such a way that the end position of the conveying chamber hose is predetermined through it.

9. A device according to claim 1, wherein a piston is provided, through which the conveying chamber hose can be deformed.

10. A device according to claim 1, wherein the length of the conveying chamber hose is at least twice the inside diameter of the conveying chamber hose.

11. A device according to claim 1, wherein the conveying chamber hose has ethylene-propylene-diene-monomer, nitrile rubber or natural rubber.

12. A device according to claim 1, wherein a double cone is provided, which on the one hand houses the conveying chamber hose and on the other hand receives the hose of the inlet valve or of the outlet valve.

13. A device according to claim 1, wherein the conveying air inlet is arranged between the inlet valve and the powder conveying chamber.

14. A method for conveying powder with a device for conveying coating powder, the device including an inlet valve and an outlet valve, wherein the inlet valve and/or the outlet valve can be controlled, and a flexible conveying chamber hose defining a powder conveying chamber, wherein the powder conveying chamber is arranged between the inlet valve and the outlet valve, the powder conveying chamber has a conveying air inlet, the volume of the powder conveying chamber is modified by deforming the conveying chamber hose, and a pressure chamber surrounding the conveying chamber is provided, the method including the following steps:

a) the inlet valve is closed, the outlet valve is opened and conveying air is blown into the powder conveying chamber via the conveying air inlet, b) the volume of the powder conveying chamber is reduced, c) the outlet valve is closed and the inlet valve is opened, d) the volume of the powder conveying chamber is increased, and e) the steps a) to d) are repeated.

15. A method according to claim 14, wherein the conveying air is blown for a specific period into the powder conveying chamber.

* * * * *